(12) United States Patent
Boyle et al.

US006831932B1

(10) Patent No.: US 6,831,932 B1
(45) Date of Patent: Dec. 14, 2004

(54) TRANSFER OF SONET TRAFFIC OVER A PACKET-SWITCHED NETWORK

(75) Inventors: James Patrick Boyle, Cary, NC (US); Steven Craig White, Denver, CO (US); Joseph Cajetan Lawrence, Boulder, CO (US)

(73) Assignee: Level 3 Communications, Inc., Broomfield, CO (US)

(*) Notice: Subject to any disclaimer, the term of this patent is extended or adjusted under 35 U.S.C. 154(b) by 578 days.

(21) Appl. No.: 09/616,879

(22) Filed: Jul. 14, 2000

(51) Int. Cl.$^7$ .................................................. H04J 3/02
(52) U.S. Cl. ..................................... 370/539; 370/471
(58) Field of Search ........................... 370/395.1, 395.5, 370/395.52, 395.6, 401, 465, 466, 467, 471, 474, 536, 539

(56) References Cited

U.S. PATENT DOCUMENTS

| | | | | |
|---|---|---|---|---|
| 5,021,880 A | * | 6/1991 | Graves et al. | 375/240.14 |
| 5,742,765 A | * | 4/1998 | Wong et al. | 709/230 |
| 5,933,426 A | | 8/1999 | Motoori | 370/352 |
| 6,058,119 A | * | 5/2000 | Engbersen et al. | 370/466 |
| 6,075,788 A | * | 6/2000 | Vogel | 370/395.51 |
| 6,188,692 B1 | * | 2/2001 | Huscroft et al. | 370/395.51 |
| 6,240,087 B1 | * | 5/2001 | Cummings et al. | 370/360 |

FOREIGN PATENT DOCUMENTS

EP  0 574 864 A2  12/1993  ........... H04Q/11/00
EP  0 797 373 A2  9/1997
EP  0 942 621 A1  9/1999  ........... H04L/12/56

OTHER PUBLICATIONS

Herkersdorf, A., et al. "A Scalable SDH/SONET Framer Architecture for Datacom and Telco Applications" Broadband Communications, 2000 International Zurich Seminar on Zurich Switzerland Feb. 15–17, 2000, Piscataway, NJ USA, IEEE, US, pp. 191–198 XP010376459.

Malis, Andrew G., et al "SONET/SDH Circuit Emulation Over Packet (CEP) draft–ietf–pwe3–sonet–03.txt", PWE3 Working Group Internet Draft, http://www.ietf.org/internet-–drafts/draft–ietf–pwe3–sonet–03.txt, Oct. 2003, pp. 1–29.

Boyle, Jim, et al. "SONET Synchronous Transport Signal Over IP", Network Working Group Internet Drive, Jul. 2000, http://www.netzmafia.de/rfc/internet–drafts/draft–boyle–sts–ip–00.txt, pp. 1–12.

"Circuit Emulation Service Interoperability Specification" Version 2.0, af–vtoa–0078.000, The ATM Forum Technical Committee, Mountain View, California, Jan. 1997, pp. i–93.

\* cited by examiner

*Primary Examiner*—Alpus H. Hsu
*Assistant Examiner*—Toan D. Nguyen
(74) *Attorney, Agent, or Firm*—Faegre & Benson LLP (57) ABSTRACT

Synchronous Optical NETwork (SONET) traffic is sent across a packet network. A SONET transmission is decoded into a data structure. The data structure is then converted into one or more packets and sent across the packet network.

21 Claims, 9 Drawing Sheets

TRANSFER OF SONET TRAFFIC OVER A PACKET-SWITCHED NETWORK

BACKGROUND OF THE INVENTION

1. Field of the Invention

The present invention generally relates to telecommunications. More particularly, the present invention relates to a method of and system for the transfer of SONET communications across a packet network.

2. Related Art

Synchronous Optical NETwork (SONET) is a widely used standard for the transport of telecommunications traffic. SONET defines an optical based transmission hierarchy involving multiple optical carrier (OC) levels carrying digital synchronous transport signals (STSs).

In the development of telecommunications and/or data networks, significant investment is required to deliver SONET service. This investment includes the acquisition of SONET products and the procurement of optical communications media to deliver bandwidth. Unfortunately, SONET products are expensive. In addition, SONET products provide few features that enable the efficient utilization of bandwidth.

In contrast, packet switched networks, such as Internet Protocol (IP) networks, include elements such as routers and ethernet switches that are geared to much wider markets are therefore available at lower costs than SONET products. Moreover, packet switched network elements provide greater flexibility in the utilization of bandwidth.

Accordingly, what is needed is a method and system that delivers the popular SONET service, but provides the cost savings and bandwidth efficiencies associated with packet switched networks.

SUMMARY OF THE INVENTION

The present invention is directed to a method of and system for transferring Synchronous Optical NETwork (SONET) traffic across a packet network. A method, according to an embodiment of the present invention, includes the steps of reading a SONET transmission, decoding the SONET transmission into a data structure, converting the data structure into packets, and sending the packets across the packet network.

In an embodiment of the present invention, the step of converting the data structure into packets includes extracting a synchronous payload envelope (SPE) from the data structure and compressing the extracted SPE, if possible.

In a further embodiment, the step of converting the data structure into packets includes determining whether the data structure represents a slot of concatenated STS-Nc service; and if so, i) extracting a concatenated synchronous payload envelope (SPE-Nc) from the data structure, ii) fragmenting the SPE-Nc into a N SPE-1 payloads, and iii) concatenating each of the N SPE-1 payloads with a header. An advantage of the present invention is the capability to efficiently utilize bandwidth in the transfer of SONET traffic across the packet network.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS 1.0 SONET Overview SONET is a hierarchical protocol for synchronously transporting time division multiplexed (TDM) circuits across an optical network. SONET uses a basic transmission rate of (Synchronous Transport Signal 1) STS-1 that is equivalent to 51.84 Mbps. SONET slots can be associated with different transmission rates. For instance, an STS-1 slot refers to a SONET slot transported at a rate of 51.84 Mbps. Higher level signals are integer multiples of the base rate. For example, STS-3 is three times the rate of STS-1 (3×51.84=155.52 Mbps). An STS-12 rate is twelve times the rate of STS-1 (12×51.84=622.08 Mbps).

In general, SONET slots can be divided into two main areas: transport overhead and the synchronous payload envelope (SPE). The transport overhead includes line overhead (LOH) and section overhead (SOH). The SPE is 783 bytes in length and includes two parts: the path overhead (POH) and the payload. The payload is the revenue-producing traffic being transported.

Figure 1:
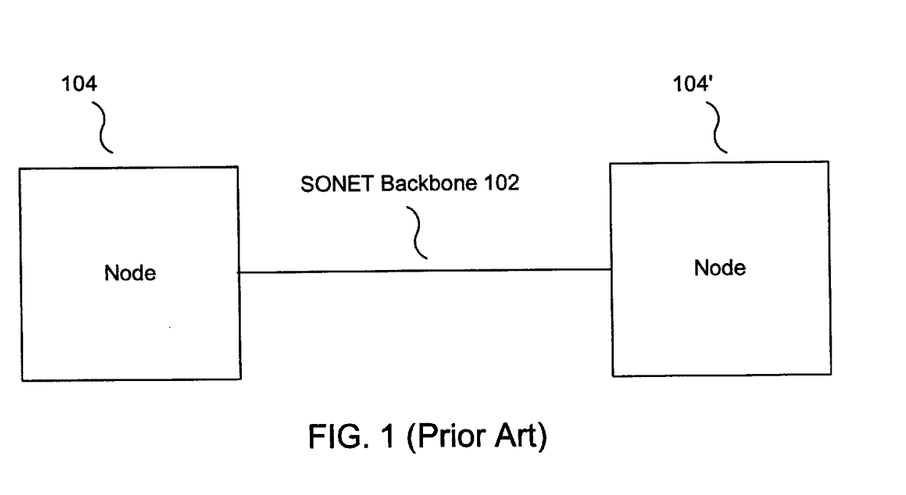
FIG. 1 is a block diagram of a conventional SONET communications infrastructure.

FIG. 1 is a block diagram of a conventional SONET communications infrastructure 100. Conventional SONET communications infrastructure 100 includes a SONET backbone 102 and first and second nodes 104, 104'. SONET backbone 102 may be any type of SONET configuration, such as a SONET ring, a complex multi-point SONET mesh network, or any other type of configuration, as would be apparent to persons skilled in the relevant art(s). First and second nodes 104, 104' are interfaces to SONET backbone 102, such as digital cross connect systems (DCCSs), or any other SONET interfaces, as would be apparent to persons skilled in the relevant art(s).

2.0 SONET Services Across Packet Networks

Figure 2:
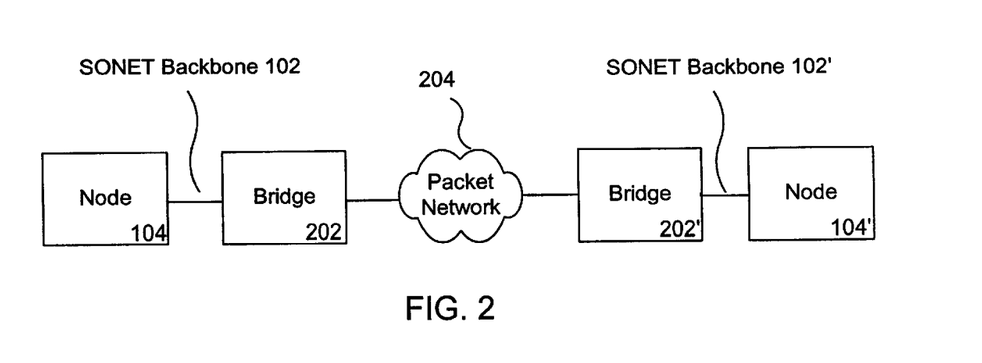
FIG. 2 is a block diagram of an exemplary communications infrastructure that provides SONET services across a packet network, according to an embodiment of the present invention.

As described herein, the present invention enables transfer of SONET communications across a packet network. FIG. 2 is a block diagram of an exemplary communications infrastructure 200 that provides SONET services across a packet network according to an embodiment of the present invention. Exemplary infrastructure 200 includes SONET backbones 102 and 102', bridges 202 and 202', and a packet network 204.

SONET backbones 102 and 102', as described above, may be any type of SONET configuration. In embodiments of the present invention, this SONET traffic may be bidirectional, and may include one or more STS slots, such as STS-1 slots, structured slots (e.g., an STS-12 slot carrying two STS-3 slots and six STS-1 slots), and/or concatenated STS-Nc slots.

Bridge 202 functions as a communications interface between SONET backbone 102 and packet network 204. Similarly, bridge 202' functions as a communications interface between SONET backbone 102' and packet network 204. Further details regarding bridges 202 and 202' are described herein with reference to FIG. 3A. In embodiments, bridges 202 and 202' have the same features and capabilities.

Packet network 204 may be any packet communications network that is recognized by persons skilled in the relevant art(s). In an embodiment, packet network 204 is an internet protocol (IP) network, such as the global Internet.

2.1 Bridge

Figure 3A:
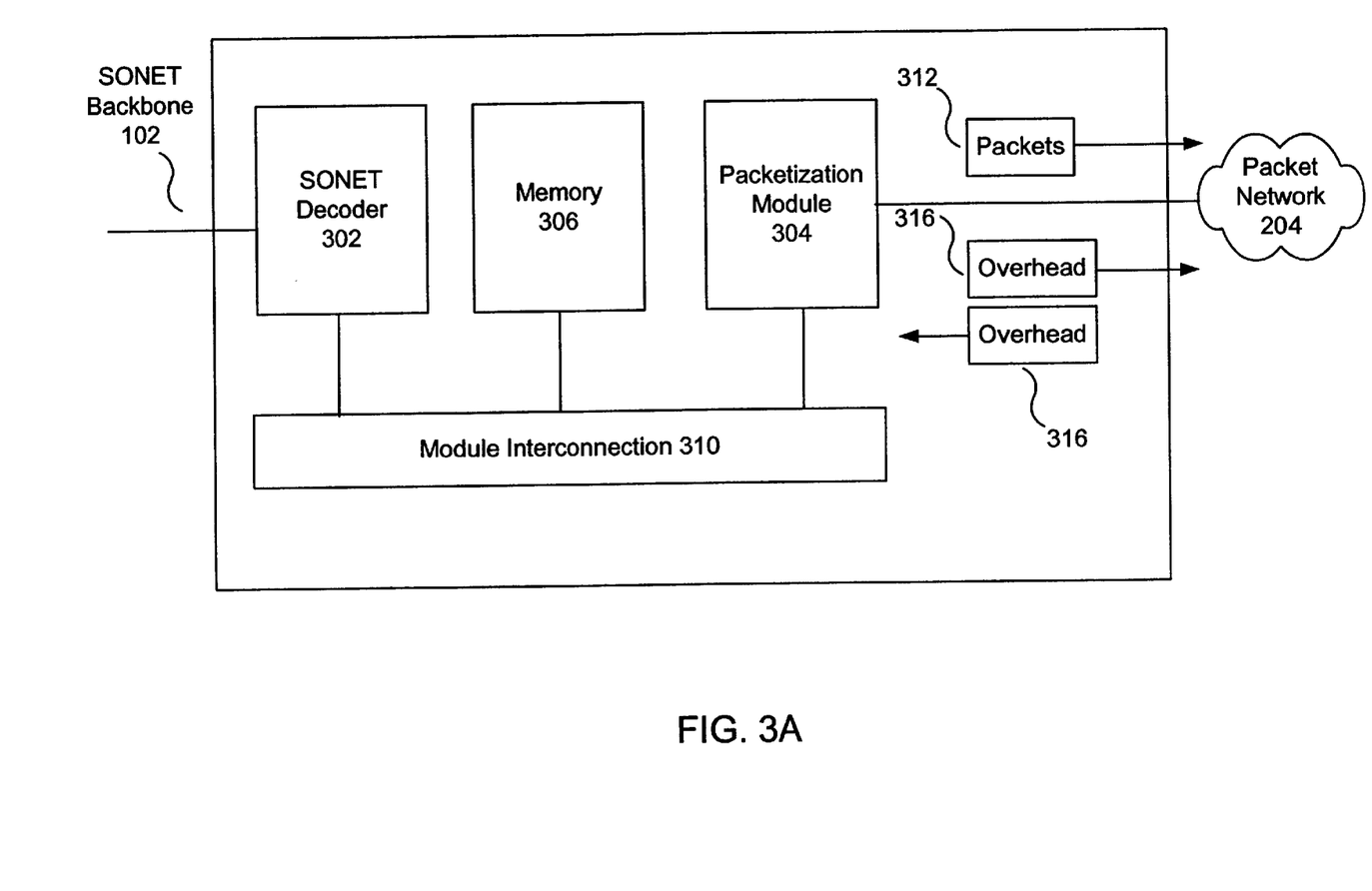
FIG. 3A is a functional block diagram of an exemplary bridge according to an embodiment of the present invention.

FIG. 3A is a functional block diagram of an exemplary bridge 202, according to an embodiment of the present invention. Exemplary bridge 202 includes a SONET decoder 302, a packetization module 304, and a memory (also referred to herein as a buffer) 306. SONET decoder 302, packetization module 304, and memory 306 are coupled by a module interconnection 310. In some embodiments, one or more of these elements may be discrete electronic components. In further embodiments, one or more of these elements may be implemented as software modules in a computer system.

SONET decoder 302 receives and processes SONET transmissions. In addition, SONET decoder 302 sends data contained in these SONET transmissions, such as STS slots, to memory 306. SONET decoder 302 also notifies packetization module 304 that STS slots are available in memory 306 for decoding. In an embodiment, SONET decoder 302 performs this notification by communicating to packetization module 304 across module interconnection 310.

Packetization module 304 retrieves one or more STS slots from memory 306. Once retrieved, packetization module 304 creates one or more packets (i.e., datagrams) 312 that correspond to these retrieved STS slot(s). In an embodiment, creation of packets 312 includes packetization module 304 extracting SPE(s) from these retrieved STS slot(s), and concatenating the extracted SPE(s) with one more headers.

In a further embodiment, SONET decoder 302 strips LOH and SOH from STS slots, and send the corresponding SPE(s) to memory 306. In these embodiments, packetization module 304 retrieves the SPE(s) from memory 306 and creates one or more packets 312 that correspond to these retrieved STS slot(s).

Packetization module 304 also sends packets 312 across packet network 204. In an embodiment, packetization module 304 additionally sends overhead information 316 across packet network 204. Overhead information 316 may enable packetization module 304 to perform functions such as guaranteeing certain qualities of service (QOS), reserving bandwidth on packet network 204, and ensuring proper delivery of packets 312.

In an embodiment, packetization module 304 sends packets 312 and overhead information 316 across packet network 204 to second bridge 202' (see FIG. 2). However, in further embodiments, packetization module 304 may send these packets to other nodes that are connected to, or integral with, packet network 204. Examples of such nodes include monitoring services that provide operational debugging, and "wiretap" nodes that monitor transmissions. These nodes may be computers, servers, routers, and/or other network nodes, as would be apparent to persons skilled in the relevant art(s).

As described herein, memory 306 is coupled to SONET decoder 302, and packetization module 304 through module interconnection 310. In an embodiment, memory 306 includes a plurality of memory locations, each capable of storing a unit of data, such as a digital word. These memory locations, also referred to herein as memory addresses, are indexed sequentially.

Module interconnection 310 enables bidirectional communications among SONET decoder 302, packetization module 304, and/or memory 306. In embodiments where SONET decoder 302, packetization module 304, and/or memory 306 are discrete electronic components, module interconnection 310 may be an electronic bus that enables digital and/or electronic communication between electronic components. However, in a further embodiment, where SONET decoder 302, packetization module 304, and/or memory 306 are implemented as software modules in a computer system, module interconnection 310 may be any type of interface that enables communication and/or transfer of information between software modules.

Figure 3B:
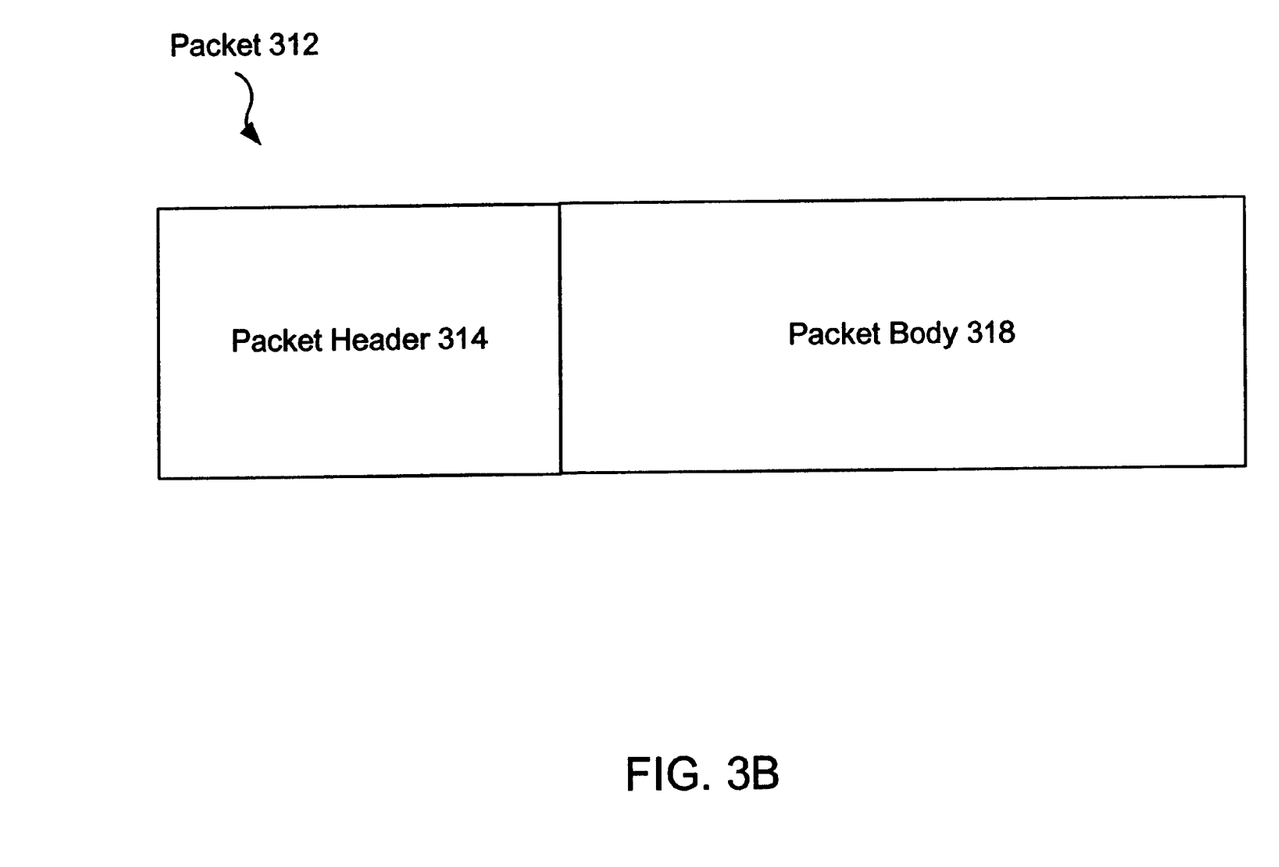
FIG. 3B is an illustration of an exemplary packet, according to an embodiment of the present invention.

FIG. 3B is an illustration of an exemplary packet 312, according to an embodiment of the present invention. Packet 312 includes a packet body 318 and a packet header 314. As described herein, packetization module 304 creates packets 312 from STS slot(s) that it retrieves from memory 306. In a further embodiment, packet body 318 includes a portion of an SPE extracted from STS(s) contained in memory 306.

In an embodiment, packet body 318 includes one or more SPEs extracted from STSs contained in memory 306. Additionally, packet body 318 may include a portion, or segment, of an SPE.

In an embodiment, packet header 314 includes one or more header fields that contain information to facilitate transmission across packet network 204. An exemplary list of header fields is provided in Table 1.

TABLE 1

| Field | Description |
|---|---|
| Version Field | This field indicates a version of service provided by bridge 102. Version field enables bridge 102 to packetize SONET information according to a plurality of packet versions. The version field also enables evolution of the service and allows for changes in syntax and form of packets 312. |
| Operation Code Field | This field indicates the type of SONET traffic that packet 312 is carrying. In an embodiment, this field identifies whether the corresponding packet 312 is carrying Operations, Administration, and Maintenance (OA&M) traffic, or user data traffic. |
| Parity Field | This field provides bit error detection. In an embodiment, the parity field comprises two bits. One of these two bits ensures a certain parity (even or odd) in the packet header 314. The other of these two bits ensures a certain parity (even or odd) in the entire packet 312. The present invention may utilize this field to perform service management functions, such as determining the bit error rate (BER) in packet network 204. The parity field may also prevent insertion of payload into an incorrect STS. In a further embodiment, this field includes cyclical redundancy check (CRC) bits that provide enhanced error detection capability, and ensures proper isolation of STS services. |
| STS Reference Field | This field contains an STS reference ID, which uniquely identifies end-to-end SONET service. As described herein with reference to FIG. 6, for the handling of concatenated STS-Nc service, this field further identifies the N component SPE-1s and/or STS-1s of the concatenated STS-Nc. |
| Sequence Number Field | This field indicates the sequence in which packets are sent across packet network 204 by bridge 202 for a particular STS reference ID. |

2.2 Transmission of SONET services (STS-Nc)

Figure 4:
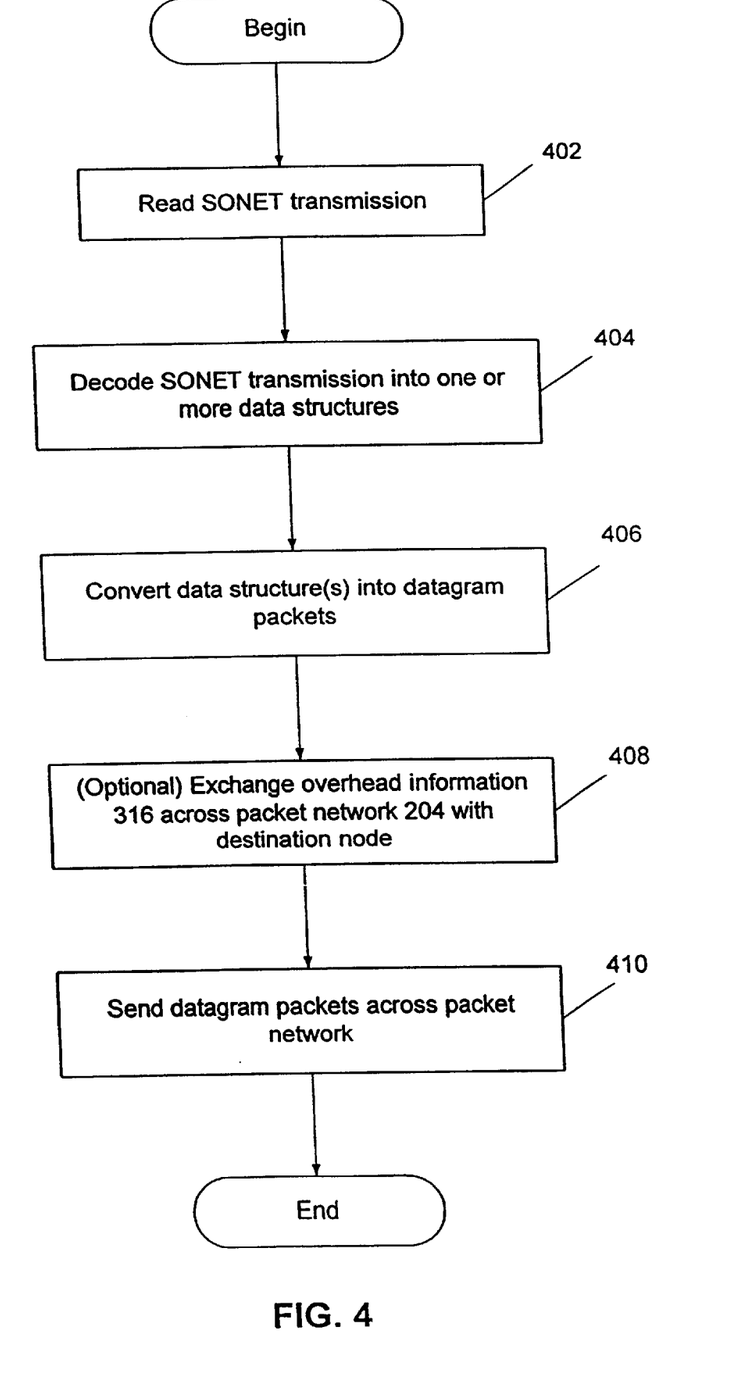
FIGS. 4–8 are flowcharts illustrating an operational sequence according to an embodiment of the present invention.

FIG. 4 is a flowchart illustrating an operational sequence according to an embodiment of the present invention. This operational sequence begins with a step 402. In step 402, bridge 202 reads a SONET transmission 104 from SONET backbone 102. In an embodiment, this step is performed by SONET decoder 302.

Next, in a step 404, bridge 202 decodes SONET transmission 104 into one or more data structures. In an embodiment, these data structures are STS slots. Step 404 may be performed by SONET decoder 302 and may comprise the step of storing the one or more data structures in memory 306.

A step 406 follows step 404. In step 406, bridge 202 converts the one or more data structure(s) into packets 310. In an embodiment, this step is performed by packetization module 304, and comprises the step of packetization module 304 accessing the one or more data structures from memory 306. The performance of step 406 is described in greater detail below with reference to FIG. 5.

An optional step 408 may be performed after step 406. In step 408, bridge 202 exchanges overhead information 316 with a destination node, such as bridge 202', across packet network 204. In an embodiment, step 408 is performed by packetization module 304. The exchange of overhead information 316 ensures that there is sufficient available bandwidth in packet network 204 to allow the timely transfer of the one or more packets 310 generated in step 406.

Next, in a step 410, bridge 202 sends the one or more packets 310 generated in step 406 across packet network 204 to one or more destination nodes, such as bridge 202'. In an embodiment, where packet network 204 is an IP network, this step may comprise the step of sending information according to a transport protocol, such as the Real-Time Transport Protocol (RTP). RTP is a well known protocol that is designed for transferring real-time data across IP packet networks. One approach places SONET payloads, into RTP payloads, as described below.

In an embodiment of the present invention, step 410 may include the step of transferring one or more packets from memory 306 to a network interface card (NIC) (not shown) that sends the packet(s) across packet network 204.

Figure 5:
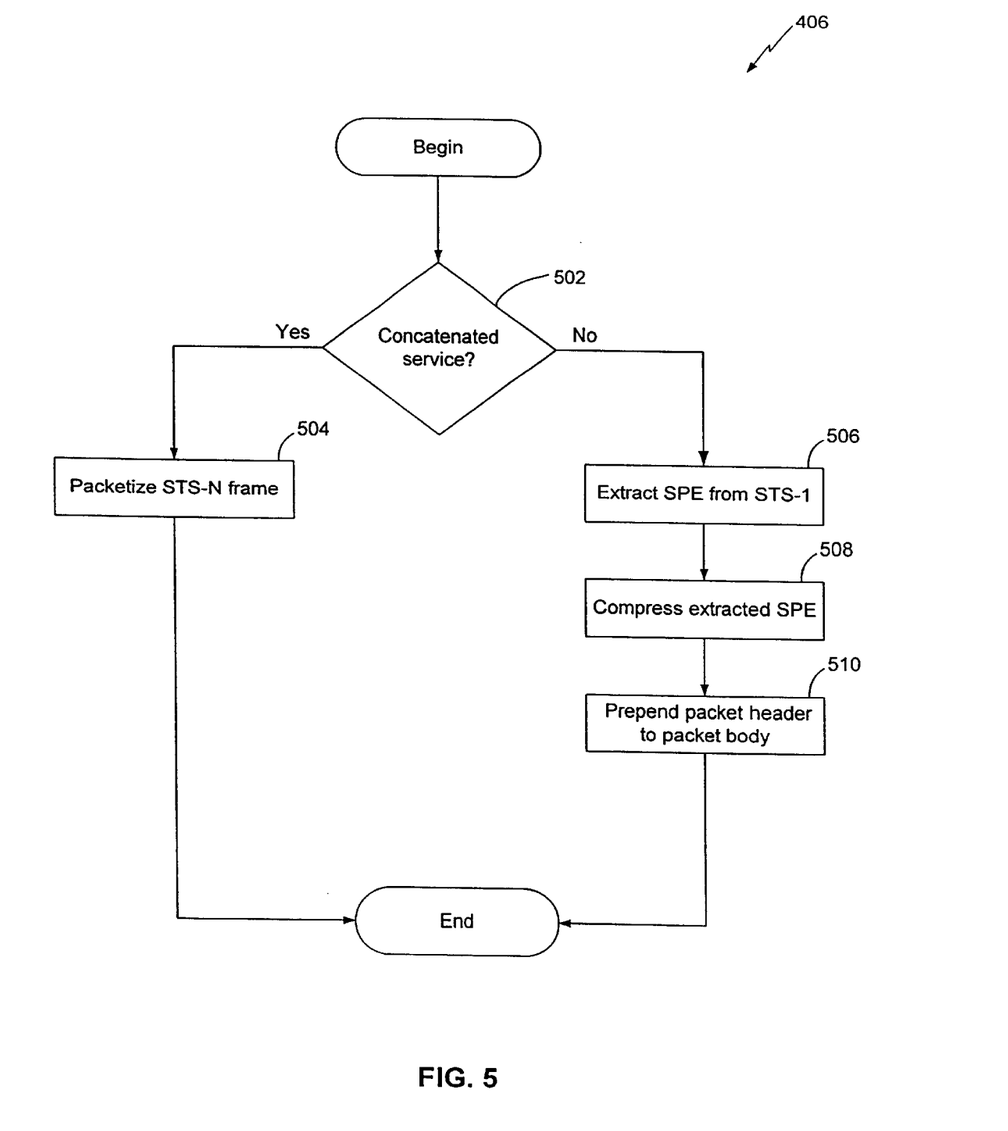

FIG. 5 is a flowchart illustrating the performance of step 406 in greater detail. This performance begins with a step 502. In step 502, bridge 202 determines whether the one or more data structures decoded during the performance of step 404 represent a slot of concatenated STS-Nc service. In an embodiment, this determination is made by inspecting the line overhead (LOH) fields of STS slots.

If the data structures represent a slot of concatenated STS-Nc service, a step 504 is performed. In step 504, the contents of the STS-Nc slot are segmented. The performance of step 504 according to two embodiments is described below with reference to FIGS. 6 and 7. Otherwise, if the one or more data structures represent an STS-1 service, a step 506 is performed.

In step 506, bridge 202 extracts the SPE from the STS-1 slot represented by the one or more data structures. In an embodiment, step 506 is performed by packetization module 304.

Next, in a step 508, bridge 202 potentially compresses the extracted SPE according to a compression scheme. This compression scheme is described below with reference to FIG. 8. In an embodiment, step 508 is performed by packetization module 304.

A step 510 follows the performance of step 508. In step 510, the extracted SPE has a header prepended to form a packet 312. In an embodiment, the header includes fields as described herein with reference to packet header 314. In an embodiment, step 510 is performed by packetization module 304.

2.3 Concatenated Service

Figure 6:
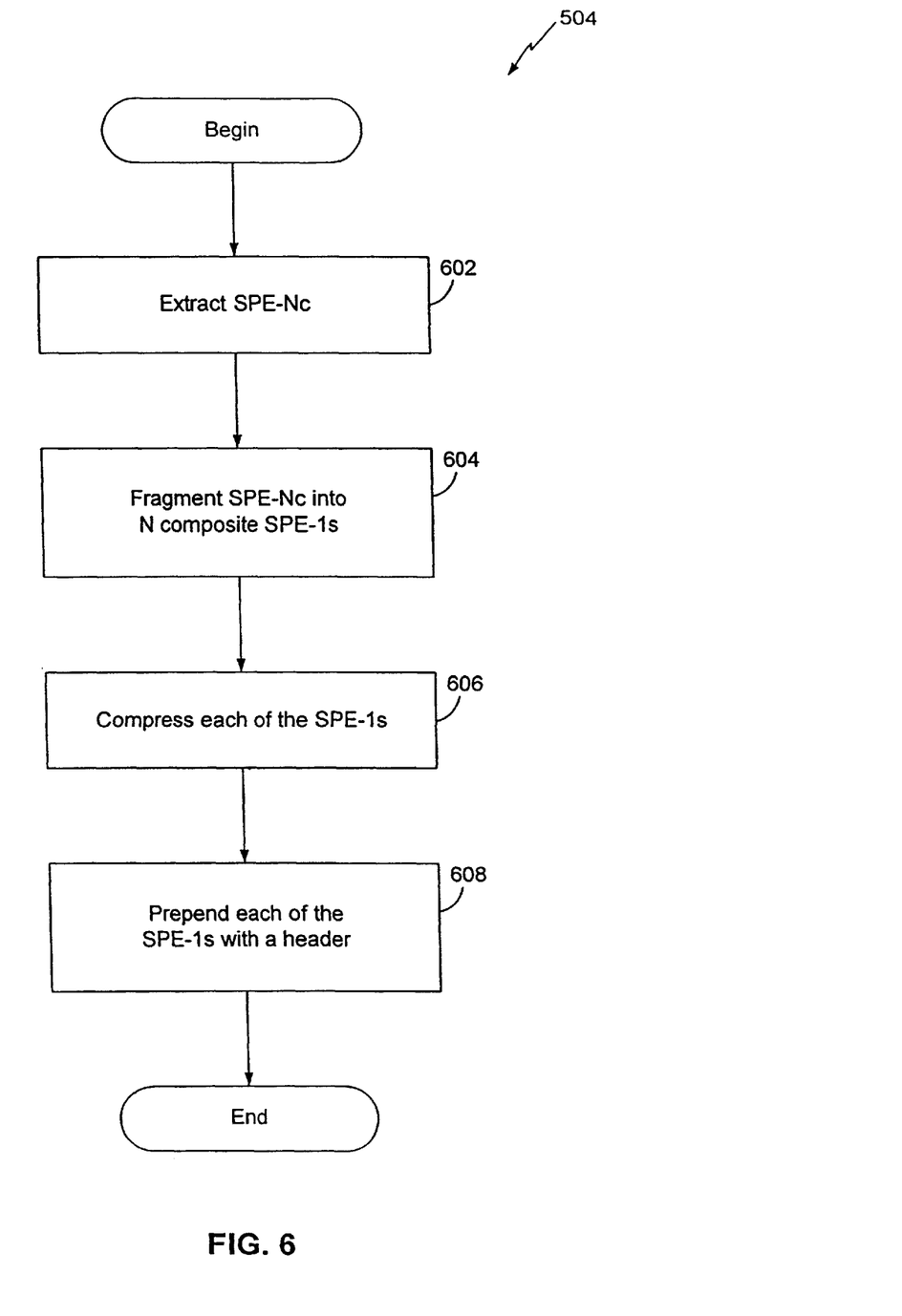
Figure 7:
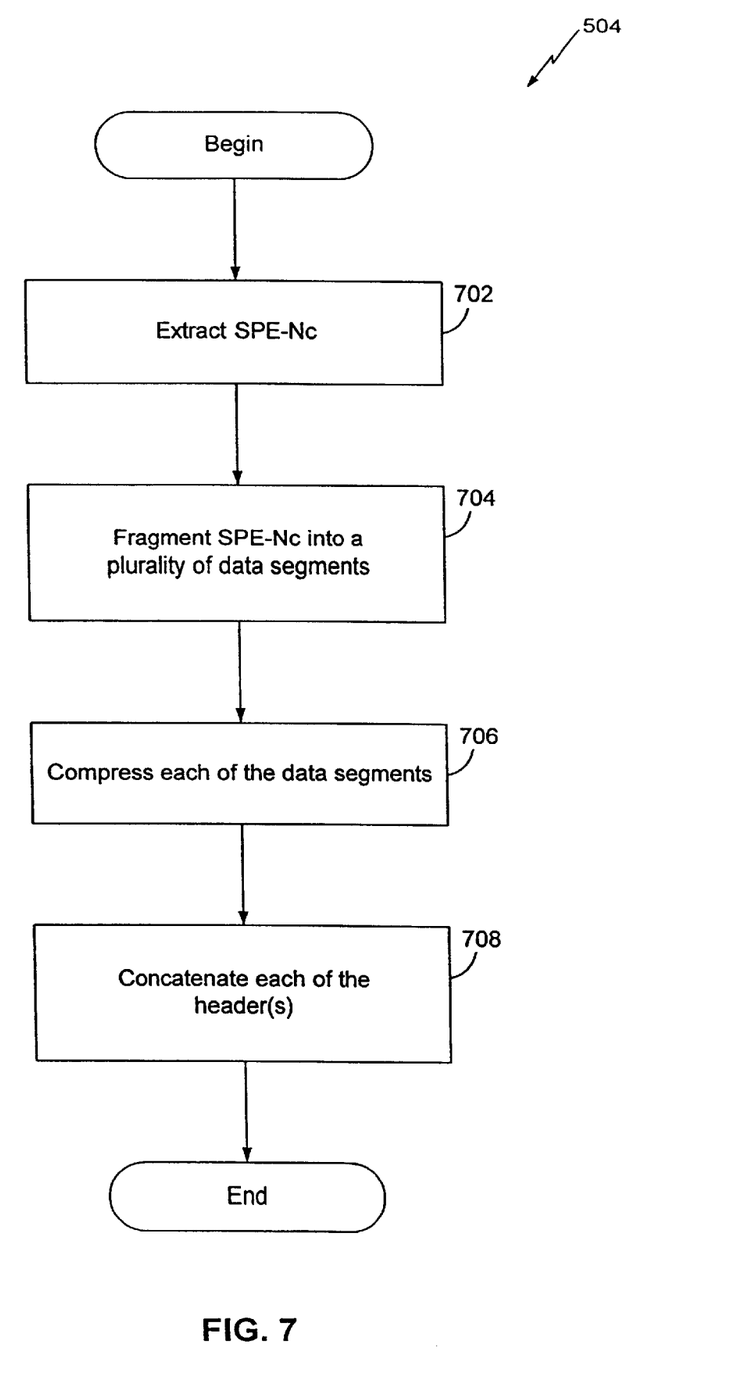

FIGS. 6 and 7 are flowcharts illustrating the performance of step 504 for concatenated STS-Nc service, according to two embodiments of the present invention. As described herein, concatenated STS-Nc service involves the transmission of N concatenated STS-1 signals across SONET backbones 102 and/or 102'. These N concatenated signals are referred to herein as STS-Nc slots. STS-Nc slots carry N concatenated SPEs that are referred to herein as SPE-Ncs. SPE-Ncs are N times greater in size than SPEs carried by STS-I slots. For example, an SPE-3c has three times the number of bits of an SPE-1.

The flowchart of FIG. 6 begins with a step 602. In step 602, an SPE-Nc is extracted from the one or more data structures decoded during the performance of step 404. In an embodiment, step 602 is performed by packetization module 304.

Next, in a step 604, the extracted SPE-Nc is fragmented into its N composite SPE-1s. In an embodiment, step 604 is performed by packetization module 304.

A step 606 follows the performance of step 604. In step 606, each of the SPE-1s created in step 604 are compressed. In an embodiment, the performance of step 606 comprises the steps described herein with reference to FIG. 8. Step 606 may be performed by packetization module 304.

In a step 608, each of the SPE-1s is concatenated with a header to form a packet 312. In an embodiment, these headers include fields as described herein with reference to packet header 314. Step 608 may be performed by packetization module 304.

As described above, FIG. 7 is a flowchart illustrating a performance of step 504 according to a further embodiment of the present invention. In particular, FIG. 7 illustrates conversion of concatenated STS-Nc slots into packets 312. This performance begins with a step 702. In step 702, an SPE-Nc is extracted from the one or more data structures decoded during the performance of step 404. In an embodiment, step 702 is performed by packetization module 304.

Next, in an optional step 704, the extracted SPE-Nc is fragmented into a plurality of data segments. In an embodiment, step 704 is performed by packetization module 304.

In a step 706, the SPE-Nc (or each of the data segments created in step 704) are compressed. In an embodiment, the performance of step 706 comprises the steps described herein with reference to FIG. 8. Step 706 may be performed by packetization module 304.

In a step 708, the SPE-Nc (or each of the data segments created in step 704) is concatenated with a header to form a packet 312. In an embodiment, these headers include fields as described herein with reference to packet header 314. Step 708 may be performed by packetization module 304.

2.4 Efficient Bandwidth Utilization

Conventional carriers of SONET traffic treat all slots the same, notwithstanding the type of service associated with each slot. The present invention provides a technique for efficient bandwidth utilization in the transfer of SONET traffic across packet network 204. STS slots can carry various types of traffic (also referred to herein as service types). The path overhead (POH) of each SPE, includes information that indicates the type of service being carried by the SPE. Examples of service types include, but are not limited to, high-level data link control (HDLC) service for IP traffic, asynchronous transfer mode (ATM) service, DS-3 service, and no service. To provide efficient bandwidth utilization, the present invention provides SPE compression techniques based on the type of service that each SPE carries.

Figure 8:
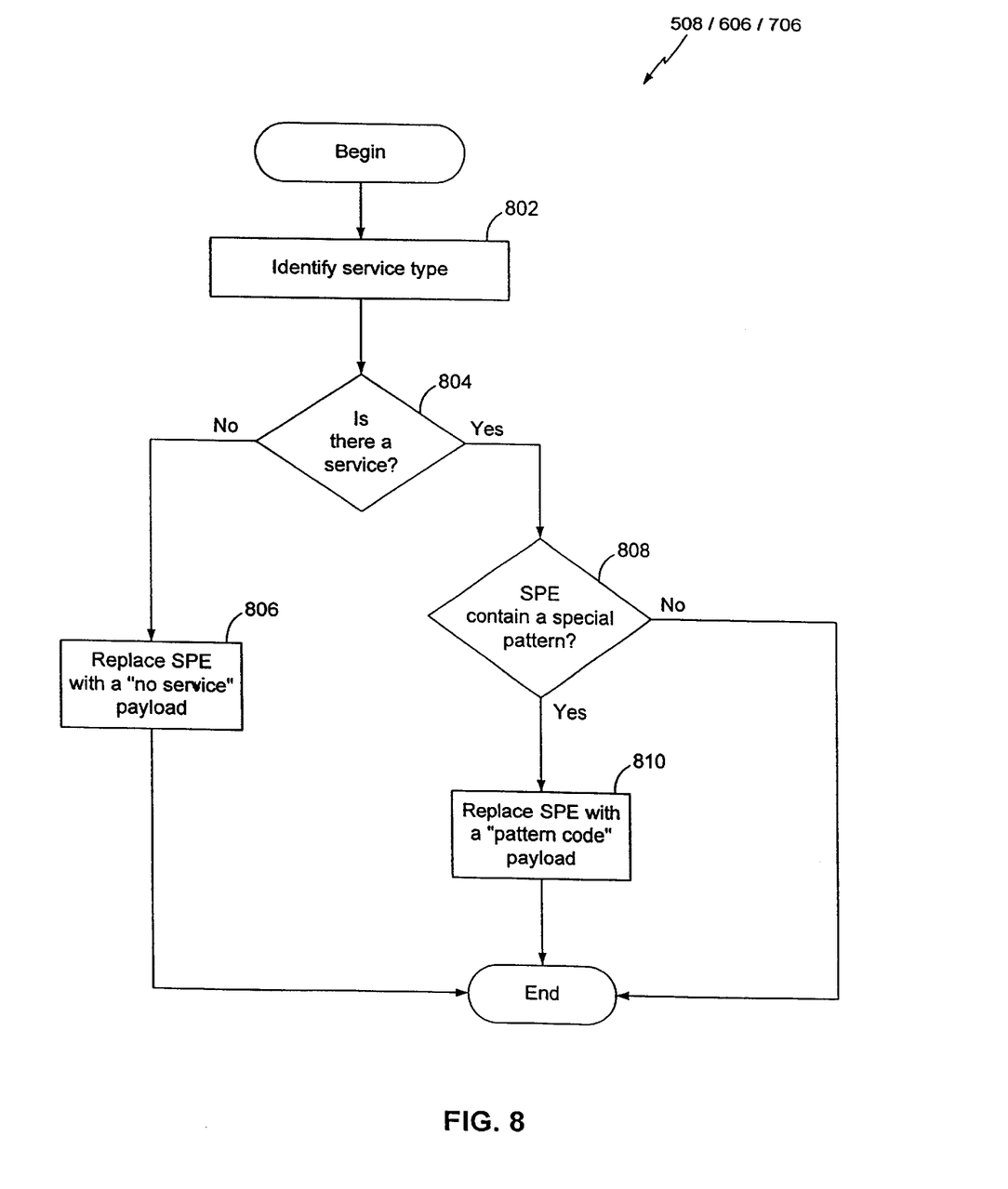

FIG. 8 is a flowchart illustrating an operational sequence of efficient bandwidth utilization according to an embodiment of the present invention. This sequence illustrates how steps 508, 606, and/or 706 may be performed according to embodiments of the present invention.

The sequence shown in FIG. 8 begins with a step 802. In step 802, bridge 202 identifies the service type being carried by the SPE extracted in step 506. In an embodiment, step 802 comprises the step of inspecting the POH of the SPE to determine service type. This step may be performed by packetization module 304.

Next, a step 804 is performed. In step 804, bridge 202 determines whether the SPE extracted in step 506 is carrying a service. If the SPE is not carrying a service, then a step 806 is performed. Otherwise, a step 808 is performed. In an embodiment, step 804 comprises the step of inspecting the POH of the SPE to determine whether the SPE is carrying a service.

In step 806, bridge 202 replaces the SPE extracted in step 506 with a "no service" payload. In an embodiment, this "no service" payload is significantly smaller than the SPE, and will be used by bridge 202 in the formation of a packet 312. This replacement achieves a more efficient use of the bandwidth of packet network 204. Step 806 may be performed by packetization module 304.

In step 808, bridge 102 determines whether the SPE extracted in step 506, 604, or 704 contains a pattern associated with the service type identified in step 802 that can be compressed. Examples of such patterns include idle HDLC cell comprising repetitive "7E" hexadecimal patterns, ATM idle cell patterns, unequipped DS-3 slots comprising repetitive zeroes, and other such patterns, as would be apparent to persons skilled in the relevant art(s) from the teachings herein. Step 808 may be performed by packetization module 304.

In an embodiment, step 808 comprises the steps of accessing a pattern database (not shown) that includes a plurality of template patterns arranged according to associated service types, and correlating the SPE extracted in step 506, 602, or 702 with the templates that correspond to the service type identified during the performance of step 802. This pattern database may be implemented in memory 306.

If bridge 202 identifies in step 808 that the SPE extracted in step 506, 602, or 702 contains a compressible pattern, then a step 810 is performed. In step 810, bridge 202 replaces the SPE extracted in step 506, 602, or 702 with a "pattern code" payload. In an embodiment, this "pattern code" payload is smaller than the SPE, and will be used by bridge 202 in the formation of a packet 312. This replacement achieves a more efficient use of packet network 204 bandwidth. Step 806 may be performed by packetization module 304. Furthermore, pattern codes may be stored in the pattern database described above.

According to an embodiment of the present invention, a similar pattern code database exists in bridge 202'. This pattern code database is used to decode received packets 312 containing "pattern codes" into the original payload received by bridge 202 from SONET backbone 102.

In addition to the techniques described above, bridge 202 may employ any data compression algorithm on the SPEs to effect efficient bandwidth utilization, as would be apparent to persons skilled in the relevant art(s).

2.5 Packet Reception

The present invention has been described with reference to bridge 202 receiving SONET transmissions from SONET backbone 102, converting this traffic into packets 312, and sending these packets 312 across packet network 204. In an embodiment, bridge 202' receives these packets 312. Bridge 202' may reassemble these packets 312 into SONET traffic, and transmit this reassembled traffic across SONET backbone 102'. Thus, the present invention provides users with transparent end-to-end SONET service. Similarly, bridge 202 may receive packets 312 from packet network 204, reassemble these packets into SONET traffics and transmit this reassembled traffic across SONET backbone 102.

In an embodiment, the reassembly of packets 312 received by bridge 202' from packet network 204 represents a reverse process of the steps described herein with reference to FIGS. 4–8. Thus, packet(s) 312 are received from packet network 312. Next, these packet(s) 312 are converted into data structure(s). These data structure(s) are encoded into SONET signals and transmitted across SONET backbone 102'.

In an embodiment, bridge 202' reorders packets received out of sequence so that they may be transmitted across SONET backbone 102' in sequence. Furthermore, bridge 202' may insert an "all ones" payload for packets that didn't arrive in time for enqueue. In addition, bridge 202' may include skew recovery buffers to accommodate situations where the contents of an STS-Nc service take multiple routes through packet network 204.

In addition, in the transmission of SONET signals across SONET backbone 102', bridge 202' may provide SONET compliant synchronization to its respective path terminating equipment. Bridge 202' may also process any line and section overhead towards the path terminating equipment and generate appropriate SONET (LOH) to indicate PTE position and status if applicable. Furthermore, bridge 202' may transmit customary SONET signals across SONET backbone 102' to indicate a payload error condition towards path terminating equipment in the event that an SPE packet is lost, arrives out of order or is otherwise not suitable for playback when received.

2.6 RTP Transport

As described herein with reference to FIG. 4, SONET payloads (SPEs) may be mapped into RTP payloads. In an embodiment, SPEs are inserted into RTP packets 8000 times a second. Bridge 202 extracts SPE(s) from the SONET transmissions. SPEs associated with a particular end-to-end user service typically occur within a SONET frame every 125 microseconds. In an embodiment, each SPE is copied in its entirety to the RTP packet payload.

Bridge 202 creates a separate RTP session for each SONET stream that it carries. The creation of separate RTP sessions enables bridge 202 to function as a "wide area" add-drop device. Thus, bridge 202 may send each SPE that it recovers to a different location. Table 2 provides a list of RTP header fields and their usage, according to an embodiment of the present invention.

TABLE 2

| Field | Description |
| --- | --- |
| Padding (P) | The padding bit may be set for reasons, such as a need for the packet to end on a certain block boundary. This such as may be required by certain encryption techniques. If used, the last padding byte contains a count of how many padding bytes should be ignored, including itself. |
| Marker (M) | The marker bit may be set to 1 on the first SPE of a concatenated service. This may used by bridge 202 to maintain sequence number synchronization. |
| Timestamp | The timestamp increments by 1 every 125 microseconds, and represents the time at which the first bit of the SPE was received by bridge 202. Since bridge 202 will mask any SONET payload "float," this number doesn't have to exactly |

TABLE 2-continued

| Field | Description |
|---|---|
| | match the receipt of the first bit. For SONET concatenated services, the timestamp will be the same for each SPE in the concatenated stream. |
| Sequence Number | Sequence number is used to indicate the order of SPE's in a concatenated service. This is used by bridge 202 to reassemble the concatenated stream, and to detect packet loss. |

2.7 Traffic Engineered Control Plane

The present invention enables proper coordination of traffic sent across packet network 204. Thus, thus bridge 202 and/or 202' may signal the bandwidth it requires from packet network 204. In an embodiment, this signaling is performed through the use of resource reservation protocol (RSVP). In a further embodiment, this signaling is performed through traffic engineered MPLS tunnels (RSVP-TE)(CRLDP) between bridges 202 and 202'. These tunnels may accommodate multiple STS services. Alternatively, these tunnels may accommodate one, or a portion of one, STS service.

MPLS tunneling enables bridge 202 and/or bridge 202' to determine route(s) for their traffic across packet network 204. In addition, MPLS tunneling enables bridge 202 and/or bridge 202' to find backup routes, and groom their traffic onto new, more optimal paths in the network.

In a further traffic coordination approach, bridges 202 and/or 202' communicate bandwidth information of the service via loosely routed TE-LSPs. Pursuant to this approach, switches with more complete information determine service routes.

3.0 Example Implementations

Bridge 202, as described herein, may be implemented with hardware, software, firmware, or any combination thereof. For example, SONET decoder 302 and packetization module 304 may be implemented with one or more Application Specific Integrated Circuits (ASICS). Alternatively, bridge 202, may be implemented with a general purpose computer system.

Figure 9:
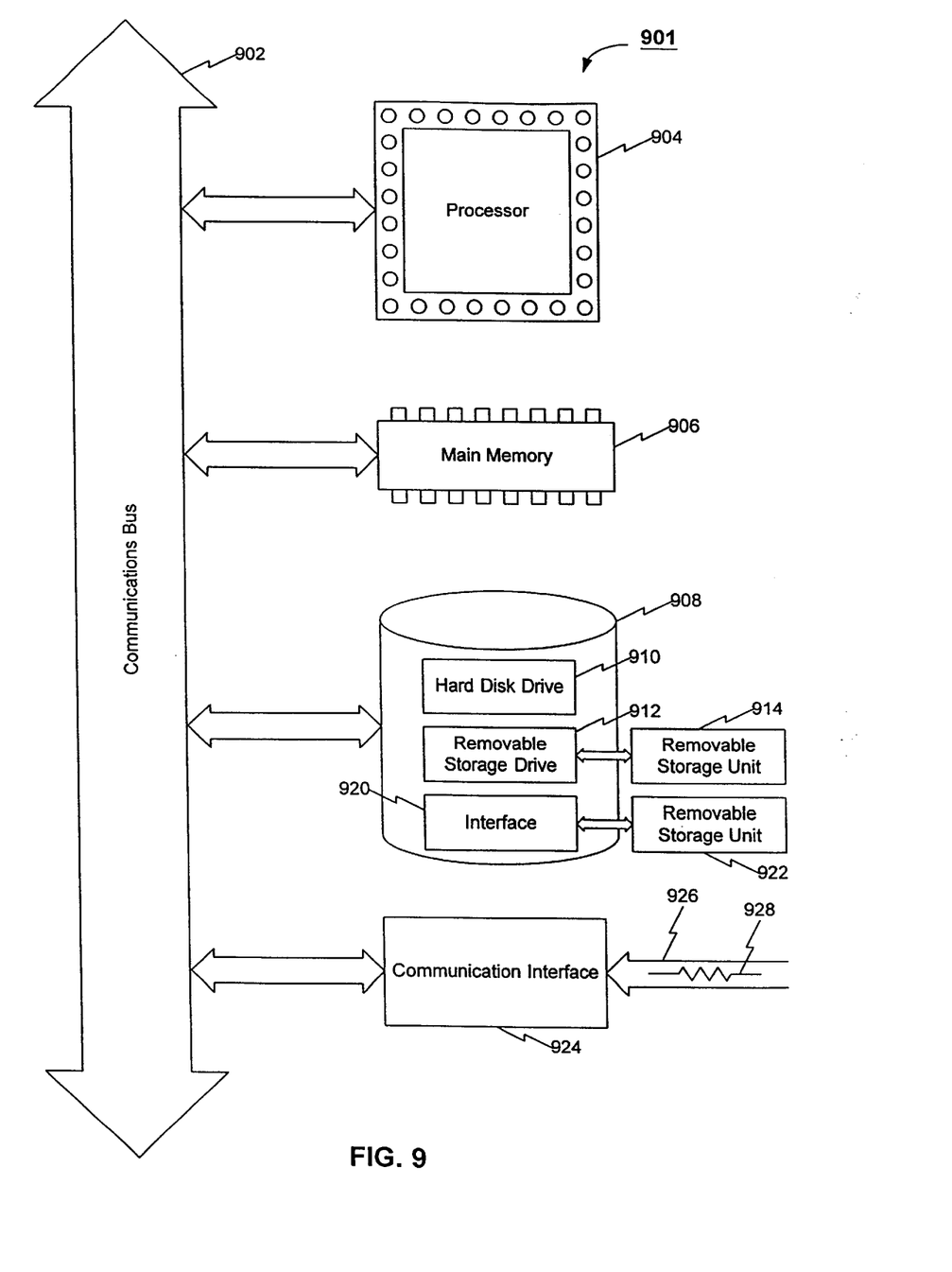
FIG. 9 is an illustration of an exemplary computer system.

An exemplary computer system 901 is shown in FIG. 9. Computer system 901 includes one or more processors, such as a processor 904. The processor 904 is connected to a communication bus 902. Various embodiments are described in terms of this example computer system. After reading this description, it will become apparent to a person skilled in the relevant art how to implement the invention using other computer systems and/or computer architectures.

Computer system 902 also includes a main memory 906, preferably random access memory (RAM), and can also include a secondary memory 908. The secondary memory 908 can include, for example, a hard disk drive 910 and/or a removable storage drive 912, representing a floppy disk drive, a magnetic tape drive, an optical disk drive, etc. The removable storage drive 912 reads from and/or writes to a removable storage unit 914 in a well known manner. Removable storage unit 914, represents a floppy disk, magnetic tape, optical disk, etc. which is read by and written to by removable storage drive 912. As will be appreciated, the removable storage unit 914 includes a computer usable storage medium having stored therein computer software and/or data.

In alternative embodiments, secondary memory 908 may include other means for allowing computer programs or other instructions to be loaded into computer system 901. Such means can include, for example, a removable storage unit 922 and an interface 920. Examples of removable storage units 922 include a program ROM cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to computer system 901.

Computer system 901 can also include a communications interface 924, such as a network interface card (NIC). Communications interface 924 allows software and data to be transferred between computer system 901 and external devices. Examples of communications interface 924 can include a modem, a network interface (such as an Ethernet card), a communications port, a PCMCIA slot and card, etc. Software and data transferred via communications interface 924 are in the form of signals which can be electronic, electromagnetic, optical or other signals capable of being received by communications interface 924. These signals 926 are provided to communications interface via a channel 928. This channel 928 carries signals 926 and can be implemented using wire or cable, fiber optics, a phone line, a cellular phone link, an RF link and other communications channels.

In this document, the terms "computer program medium" and "computer usable medium" are used to generally refer to media such as removable storage device 912, a hard disk installed in hard disk drive 910, and signals 926. These computer program products are means for providing software to computer system 901.

Computer programs (also called computer control logic) are stored in main memory and/or secondary memory 908. Computer programs can also be received via communications interface 924. Such computer programs, when executed, enable the computer system 901 to perform the features of the present invention as discussed herein. In particular, the computer programs, when executed, enable the processor 904 to perform the features of the present invention. Accordingly, such computer programs represent controllers of the computer system 901.

In an embodiment where the invention is implemented using software, the software may be stored in a computer program product and loaded into computer system 901 using removable storage drive 912, hard drive 910 or communications interface 924. The control logic (software), when executed by the processor 904, causes the processor 904 to perform the functions of the invention as described herein.

In yet another embodiment, the invention is implemented using a combination of both hardware and software. Examples of such combinations include, but are not limited to, microcontrollers.

4.0 Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. For instance, the present invention is not limited to SONET traffic, but other applicable types of traffic, as would be apparent to persons skilled in the relevant art(s). Thus, the breadth and scope of the present invention should not be limited by any of the above-described exemplary embodiments, but should be defined only in accordance with the following claims and their equivalents.

What is claimed is:

1. A method of transferring Synchronous Optical NETwork (SONET) traffic across an Internet Protocol (IP) packet network comprising:

receiving a SONET transmission;
decoding the SONET transmission into a data structure;
converting the data structure into one or more packets, including
extracting a Synchronous Payload Envelope (SPE) from the data structure,
compressing the extracted SPE for transmission across the IP-based packet network, and
inserting the compressed SPE into a payload of the one or more packets; and
sending the one or more packets across the IP-based packet network.

2. The method of claim 1, wherein said converting the data structure into one or more packets further comprises:
determining whether the data structure represents a slot of concentrated Synchronous Transport Slot (STS-Nc) service; and
if the data structure represents a slot of concentrated STS-Nc service,
extracting a concatenated payload (SPE-Nc) from the data structure,
fragmenting the SPE-Nc into a N SPE-1 payloads, and
prepending each of the N SPE-1 payloads with a header.

3. The method of claim 1, further comprising compressing one or more of the N SPE-1 payloads.

4. The method of claim 1, wherein said converting the data structure into one or more packets further comprises:
determining whether the data structure represents a slot of concatenated STS-Nc service; and
if the data structure represents a slot of concatenated STS-Nc service,
extracting a concatenated payload (SPE-Nc) from the data structure,
fragmenting the SPE-Nc into a plurality of data segments, and
prepending each of the plurality of data segments with a header.

5. The method of claim 4, further comprising compressing one or more of the plurality of data segments.

6. A method of transferring Synchronous Optical NETwork (SONET) traffic comprising:
receiving a SONET transmission;
decoding the SONET transmission unto a data structure;
converting the data structure into one or more packets by
determining whether the data structure represents a slot of concatenated Synchronous Transport Slot (STS-Nc) service, and
if the data structure represents a slot of concatenated STS-Nc service, then
extracting a concatentated Synchronous Payload Envelope (SPE-Nc) payload from the data structure,
fragmenting the SPE-Nc payload into N SPE-1 payloads,
compressing one or more of the N SPE-1 payloads, and
prepending each of the N SPE-1 payloads with a header; and
sending the one or more packets across a packet-switched network.

7. A method of transferring Synchronous Optical NETwork (SONET) traffic comprising:
receiving a SONET transmission;
decoding the SONET transmission into a data structure;
converting the data structure into one or more packets by determining whether the data structure represents a slot of concatenated STS-Nc service, and
if the data structure represents a slot of concatenated Synchronous Transport Slot (STS-Nc) service, then
extracting a concatenated Synchronous Payload Envelop (SPE-Nc) payload from the data structure,
fragmenting the SPE-Nc payload into a plurality of data segments,
compressing one or more of the plurality of data segments and
prepending each of the plurality of compressed data segments with a header; and
sending the one or more packets across a packet-switched network.

8. A method of transferring Synchronous Optical NETwork (SONET) traffic comprising:
receiving a SONET transmission comprising a plurality of Synchronous Transport Slots (STSs);
decoding the SONET transmission into a data structure;
converting the data structure into one or more packets by
extracting one or more Synchronous Payload Envelopes (SPEs) from the plurality of STSs, and
selectively compressing the extracted SPSs to which the extracted SPE corresponds; and
transmitting the one or more packets across a packet-switched network.

9. The method of claim 8, wherein said converting the data structure into one or more packet further comprises placing SONET payloads into Real-Time Transport Protocol (RTP) payloads.

10. The method of claim 9, wherein said selectively compressing the extracted SPEs based upon a type of service comprises in response to identifying an SPE that is not carrying a service, representing the SPE in a more efficient manner for transmission across the packet-switched network by inserting in to a payload of a packet a predetermined pattern of data rather than inserting the SPE into the payload.

11. A method of transferring Synchronous Optical NETwork (SONET) traffic comprising:
receiving a SONET transmission comprising a plurality of Synchronous Transport Slots (STSs);
decoding the SONET transmission into a data structure;
extracting Synchronous Payload Envelopes (SPEs) from the plurality of STSs in the data structure;
inserting a representation of a SPE of the extracted SPEs into payloads of one or more packets;
decoupling end-to-end timing signaling associated with the SONET transmission and allowing resynchronization by a recipient of the SONET transmission by providing timing information corresponding to the SPE in a header of the one or more packets; and
transmitting the one or more packets across a packet-switched network.

12. The method of claim 11, further comprising selectively compressing one or more of the extracted SPEs based upon a type of service associated with the STS of the plurality of STSs to which the one or more of the extracted SPEs correspond.

13. The method of claim 12, wherein said selectively compressing comprises inserting one of a set of predetermined patterns of data into a payload of a packet in place of the on or more of the extracted SPEs.

14. A network device comprising:
a first interface configured for communication with a Synchronous Optical NETwork (SONET) backbone;

a second interface configured for communication with a packet-switched network;

a memory;

a SONET decoder coupled to the memory and the first interface to receive SONET transmissions from the SONET backbone via the first interface, the SONET decoder configured to store Synchronous Transport Signal (STS) payload information associated with the SONET transmissions in the memory; and a packetization module coupled to the memory and configured to transmit the STS payload information over the packet-switched network by extracting the STS payload information from the memory, selectively compressing the extracted STS payload information based upon an associated type of service, inserting the selectively compressed STS payload information into payloads of one or more packets, and transmitting the one or more packets via the second interface.

15. The network device of claim 14, wherein the network device comprises a bridge.

16. A network device comprising:

a first interface configured for communication with a Synchronous Optical NETwork (SONET) backbone;

a second interface configured for communication with a packet-switched network;

a memory;

a SONET decoder coupled to the memory and the first interface to receive SONET transmission from the SONET backbone via the first interface, the SONET decoder configured to store Synchronous Transport Signal (STS) payload information associated with the SONET transmission in the memory; and a packetization module coupled to the memory and configured to transmit the STS payload information over the packet-switched network by extracting the STS payload information from the memory, inserting a representation of the STS payload information into payloads of one or more packets, decoupling end-to-end timing signaling associated with the SONET transmission and allowing resynchronization by a recipient of the SONET transmission by providing timing information corresponding to the STS payload information in a header of the one or more packets, and transmitting the one or more packets via the second interface.

17. The network device of claim 16, wherein the network device comprises a bridge.

18. A network device comprising:

a first interface means for communicating with a Synchronous Optical NETwork (SONET) backbone;

a second interface means for communicating with a packet-switched network;

a memory means for storing Synchronous Transport Signal (STS) payload information associated with SONET transmissions received on the first interface means;

a SONET decoder means coupled to the memory means and the first interface means, for decoding the SONET transmissions and storing Synchronous Transport Signal (STS) payload information associated with the SONET transmissions in the memory means; and a packetization means, coupled to the memory, for transmitting the STS payload information over the packet-switched network by extracting the STS payload information from the memory, inserting a representation of the STS payload information into payloads of one or more packets, decoupling end-to-end timing signaling associated with the SONET transmission and allowing resynchronization by a recipient of the SONET transmissions by providing timing information corresponding to the STS payload information in a header of the one or more packets, and transmitting the one or more packets via the second interface means.

19. The network device of claim 18, wherein the network device comprises a bridge.

20. A system comprising:

a first network device configured for communication with a Synchronous Optical NETwork (SONET) network via a first interface and configured for communication with a packet-switched network via a second interface;

a second network device configured for communication with the packet-switched network; and wherein the first network device is configured to transfer SONET traffic received on the first interface from the SONET network over the packet-switched network to the second network device by extracting Synchronous Transport Signal (STS) payload information from the SONET traffic, selectively compressing the extracted STS payload information based upon an associated type of service, packetizing the selectively compressed STS payload information into payloads of one or more packets, and transmitting the one or more packets via the second interface.

21. A system comprising:

a first network device configured for communication with a Synchronous Optical NETwork (SONET) network via a first interface and configured for communication with a packet-switched network via a second interface;

a second network device configured for communication with the packet-switched network; and wherein the first network device is configured to transfer a SONET transmission received on the first interface from the SONET network over the packet-switched network to the second network device by extracting Synchronous transport Signal (STS) payload information from the SONET transmission, packetizing the STS payload information into payloads of one or more packets, decoupling end-to-end timing signaling associated with the SONET transmission by providing timing information corresponding to the STS payload information in a header of the one or more packets, and transmitting the one or more packets via the second interface.

* * * * *

UNITED STATES PATENT AND TRADEMARK OFFICE
CERTIFICATE OF CORRECTION

PATENT NO. : 6,831,932 B1
APPLICATION NO. : 09/616879
DATED : December 14, 2004
INVENTOR(S) : Boyle et al.

It is certified that error appears in the above-identified patent and that said Letters Patent is hereby corrected as shown below:

Col. 11 starting on line 23, delete "fragmenting the SPE-Nc into a N SPE-1 payloads" and insert --fragmenting the SPE-Nc into N SPE-1 payloads--, therefor.

Col. 11 line 46, delete "transmission unto" and insert --transmission into--, therefor.

Col. 12 line 11, please delete "segments and" and insert --segments, and--, therefor.

Col. 12 starting on line 24, please delete "selectively compressing the extracted SPSs" and insert --selectively compressing the extracted SPEs based upon a type of service associated with the STS of the plurality of STSs--, therefor.

Col. 12 line 29, delete "one or more packet" and insert --one or more packets--, therefor.

Col. 12 on line 37, please delete "inserting in to" and insert --inserting into--, therefor.

Col. 12 on line 64, please delete "on or more" and insert --one or more--, therefor.

Col. 14 on line 15, please delete "SONET transmission" and insert --SONET transmissions--, therefor.

Col. 14 on line 54, delete "transport Signal" and insert --Transport Signal-- therefor.

Signed and Sealed this

Fifth Day of February, 2008

JON W. DUDAS
*Director of the United States Patent and Trademark Office*